May 20, 1969  W. E. CLARKE  3,445,812
SEQUENCE CONTROL SYSTEM AND METHOD
Filed Oct. 18, 1965  Sheet 1 of 2

WALLACE E. CLARKE
INVENTOR.
BY Westell & Hanley

WALLACE E. CLARKE ~ INVENTOR.

BY Westell & Hanley

United States Patent Office 3,445,812
Patented May 20, 1969

3,445,812
SEQUENCE CONTROL SYSTEM AND METHOD
Wallace Eugene Clarke, Belleville, Ontario, Canada, assignor to Northern Electric Company Limited, Montreal, Quebec, Canada
Filed Oct. 18, 1965, Ser. No. 496,872
Int. Cl. H04q 3/64; H04m 3/38
U.S. Cl. 340—147
18 Claims

ABSTRACT OF THE DISCLOSURE

A request for an operation to be performed in indicated by connecting an input control line to a voltage datum. When the number of requests exceeds the number of means to perform the requested operation, the input control lines are connected with sequence control lines in order of priority, the priority being determined by the length of time a connected input control line has remained connected. Whein an input control line is connected to a sequence control line of highest priority, the operation is performed and the input control line is disconnected. An input control line may become disconnected from a sequence control line to connect to one of next higher priority or because of disconnection of the datum potential indicating withdrawal of the request. In the latter case priority is lost and if the withdrawn request is renewed, the request starts at lowest priority.

---

This invention relates to a system and a method for use where the performance of a plurality of operations are individually requested by the closing of connections in corresponding electrical circuits each closure signalling a request but where a more limited number of such operations can be performed at one time, and the invention will have principal application to situations where it is desirable that the operations be performed in a sequence where the order of performance is determined by the relative waiting time after such requests.

The invention is described as if only one operation were performable at a time although this is not necessarily so.

This invention has particular application to a system and a method for use where a plurality of program sources are arranged for connection to a more limited number of program inputs. Although the invention is disclosed with one program input, only available for a plurality of sources, it should be noted that the invention disclosed is useful for any number of program inputs, since the invention is primarily concerned with sources waiting to use inputs then unavailable.

It is an object of this invention to provide a sequence control system and a method of controlling the sequence of performance of operations so that, in response to a plurality of individual requests for the performance of such operations, each evidenced by the closing of a connection in a corresponding electrical circuit, and where such requests are in excess of the number of operations which can be performed at that time, the excess requests are later dealt with in order determined by the order of connection of those corresponding electrical circuits which remain connected at the time the respective requests are dealt with.

It is an object of this invention to provide a method and means as described in the preceding paragraph where the priority acquired by the closing of an electrical connection is lost if such connection is opened before the request is dealt with, and the lost priority is made available to the then connected circuit of next lower priority, whose priority is in turn made available to the next lower then connected circuit, and so on.

It is an object of this invention to provide a system and a method whereby, program sources waiting to use a program input are connected to such an input in such sequence that the source which has been waiting longest is first connected to the input.

It is an object of this invention to provide means and a method whereby program sources waiting to use a program input, wait for connection in order of priority and where a waiting source which disconnects from the "waiting" order loses its priority and becomes of lowest priority when it reconnects.

It is an object of this invention to provide means and a method whereby with program sources waiting in order of priority to use a program input, the priority of a source disconnected from the system is made available to the waiting source of next lower priority; whereupon the priority of such next lower priority source is made available to its next lower priority source, and so on.

In drawings which illustrate a preferred embodiment of the invention:

FIGURE 1 indicates circuitry for connecting microphones to a public address system;

The specific embodiment of the invention, shows the invention applied to a system where a loudspeaker may be used by any one of ten microphones and where only one microphone at a time may be connected to the system input.

In the decription of the specific embodiment to follow, the various relays have distinguishing letters and numbers, e.g., KS1, KA4, etc. All the relays with the same letters, e.g., KS1, KS2, etc., are energized in a similar manner. Each relay may operate many sets of contacts and these are designated by a dash and number, e.g. "–3" appended to the designation of the relay which controls them. Thus the contacts operated by relay KS2 might be KS2–1, KS2–2, etc. In general the similarly numbered contacts of one type of relay, say KS, will perform a similar function — thus, contacts KS1–4. KS2–4, KS3–4, etc., will perform a similar function.

Figure 4:
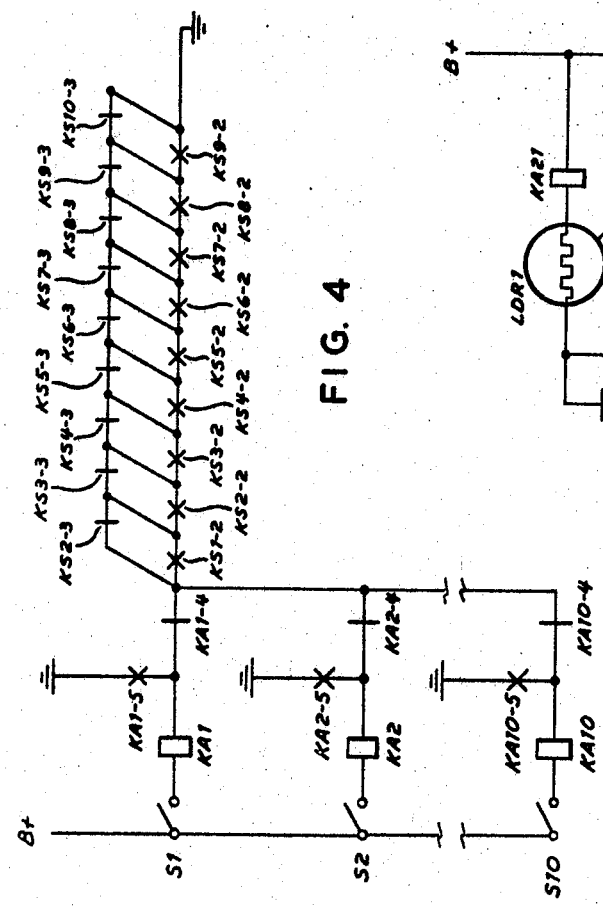
FIGURE 4 shows means for controlling the circuitry of FIGURE 3.
Figure 1:
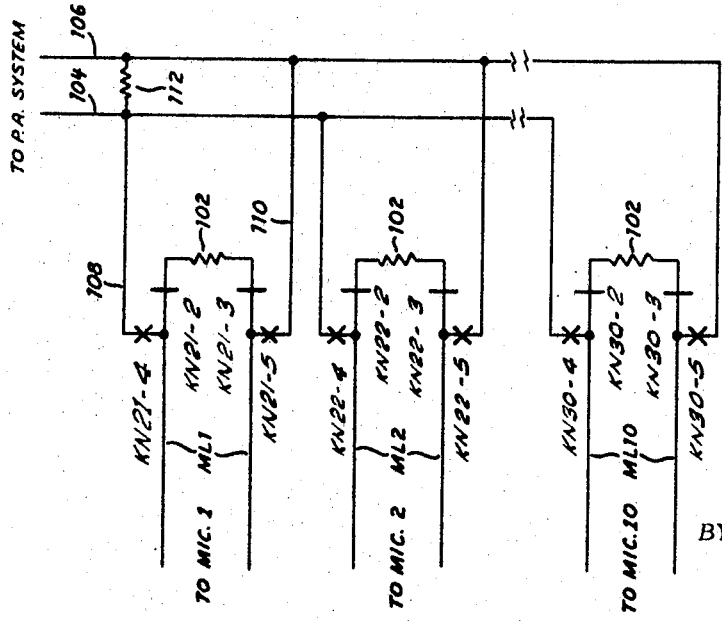

In FIGURE 1 are shown some of the leads to program sources being in the preferred embodiment, microphones designated 1 to 10. The leads for microphones 1, 2, and 10 are shown, it being realized that the remainder are located in order between microphone 2 and microphone 10 and that the circuitry for the remainder is similar to that shown. The leads ML1 of microphone 1 are joined through a resistance 102 and are connected thereto by the normally closed contacts –2 and –3 respectively of a relay KN21. Leads ML1 are connected to lines 108–110 and thence to the input lines 104 and 106 of a public address system, respectively, through normally open contacts –4 and –5 respectively of the relay KN21. The lines 104, 106 are joined through a matching resistance 112. Thus in the normal state of relay KN21 leads ML1 are connected across resistance 102 but not across lines 104 and 106. However, on energization of relay KN21, leads ML1 are connected across lines 104 and 106 (by contacts KN21–4 and –5) and disconnected from resistance 102 (by contacts KN21–2 and –3). Similarly, and in relation to microphone 2, leads ML2 are connectable to lines 104 and 106 and disconnectable from resistance 102 by the leads −2 to −5 of relay KN22 operating in a similar manner, in relation to leads ML2 as relay KN21 in relation to leads ML1. Similar connections for microphones 3–10 are provided, respectively controlled by the −2 to −5 contacts of corresponding relays KN23 to KN30. Referring to FIGURE 4, a switch S1 is connected by means not shown for closure when a microphone key is depressed, and for opening when a microphone key is released; and for the other microphones 2 to 10 correspondingly numbered switches S2 to S10 are provided operated by the respective microphone keys on the same basis as S1. The circuitry containing these switches is indicated in FIGURE 4 where a B+ source is connected to one side of switch S1, the other side of switch S1 being connected through relay KA1 and its normally closed contacts KA1–4 and from thence through a "Lockout" line 133 (to be described hereafter) to ground with the relay KA1 being alternatively connected to ground through its normally open contacts KA1–5. Similar circuitry is provided for each of the switches S2 to S10, each being connectable through respective relays KA2 to KA10 to the same "lockout" line 133, or to ground under the control respectively of relays KA2 to KA10 and their respective −4 and −5 contacts. The lockout line 133 comprises nine parallel circuits arranged in series between the −4 contacts of the ten KA relays and ground. The parallel circuits comprise; the normally open contacts −2 of a relay KS1 and normally closed contacts −3 of a relay KS2, in parallel; the normally open contacts −2 of a relay KS2 and the normally closed contacts −3 of a relay KS3, in parallel; the other seven parallel circuits providing the normally open contacts −2 of a relay KSN in parallel with the normally closed contacts −3 of a relay KS(N+1) for N progressing integrally from N=3 to N=9.

Figure 2:
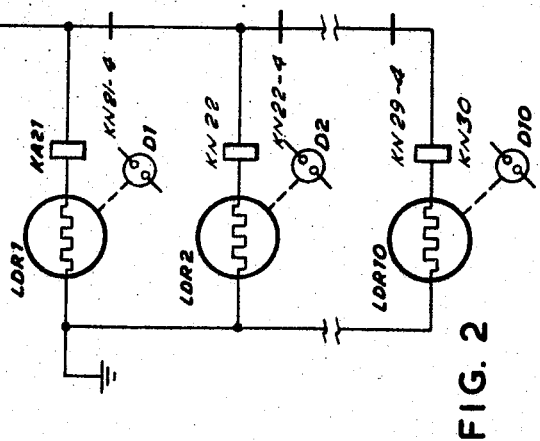
FIGURE 2 shows circuitry actuable by the sequence control system to control the operation of the circuity of FIGURE 1.

It will be noted from the arrangement of this lockout line 133 that if no KS relays are energized or if those which are energized are numbered consecutively upward from and including KS1 without any numerical gap, then a closure of any switch S will energize the corresponding KA relay since a conducting path will be provided through the lockout line 133 to ground. On the other hand it will be noted that if any KS relay is energized (say) KS3 opening the KS3–3 contact while the KS relay next lower in number i.e., KS2, is deenergized, leaving KS2–2 open, then closing of any switch S will fail to energize the corresponding KA relay since KS2–2 and KS3–3 are both open simultaneously and there is no available conducting path through lockout line 133 to ground. In FIGURE 2 is shown a B+ source connected to ground, across 10 circuits in parallel. These circuits each comprise a relay and a light-dependant resistor connected in series, the first circuit comprising relay KN21 and light-dependant resistor LDR1, the second circuit comprising relay KN22 and light-dependant resistor LDR2, and so on with the tenth circuit comprising relay KN30 and light-dependant resistor LDR10.

Each light-dependant resistor LDR is located within the range of light radiation of the correspondingly numbered gas diode. Such diodes being all connected to a line SCL1. Thus LDR1 is associated with gas diode D1, LDR2 with diode D2, etc. Each light-dependant resistor is designed and constructed so that without light radiation, the current therethrough is insufficient to energize the series connected KN relay while with radiation from the corresponding gas diode, the light-dependant resistor resistance is lowered to allow sufficient current flow to energize such relay.

The series circuits each comprising a light-dependant resistor and a KN relay may be connected directly to ground, but are provided in their connections to the B+ source with means to avoid the possibility of simultaneous conduction in two lines. This is accomplished by connecting the first series line (containing KN21) directly to B+, the second series line containing KN22 to B+ through normally closed contacts KN21–4, the third series line to B+ through contact KN21–4, KN22–4 and so on. Thus the "nth" series line will only be connected to B+ if the n−1 lines are deenergized. Further, if two lines, say the first and second are rendered conducting by the simultaneous radiation effects of diodes D1 and D2 on resistors LDR1, and LDR2, respectively, then energization of relay KN21 will open contacts KN21–4 preventing conduction through relay KN22. Thus on the tendency of simultaneous conduction in two of the series circuits, the lower numbered circuit will gain priority and will be the only one to conduct. However, in accord with the circuitry to be discussed hereafter, once a series circuit of higher number is conducting it will not be interrupted due to conduction in a circuit of lower number since the circuitry to be described will prevent the conduction in, and hence radiation from a diode D1 to D10 when another diode in this series is already conducting.

Figure 3:
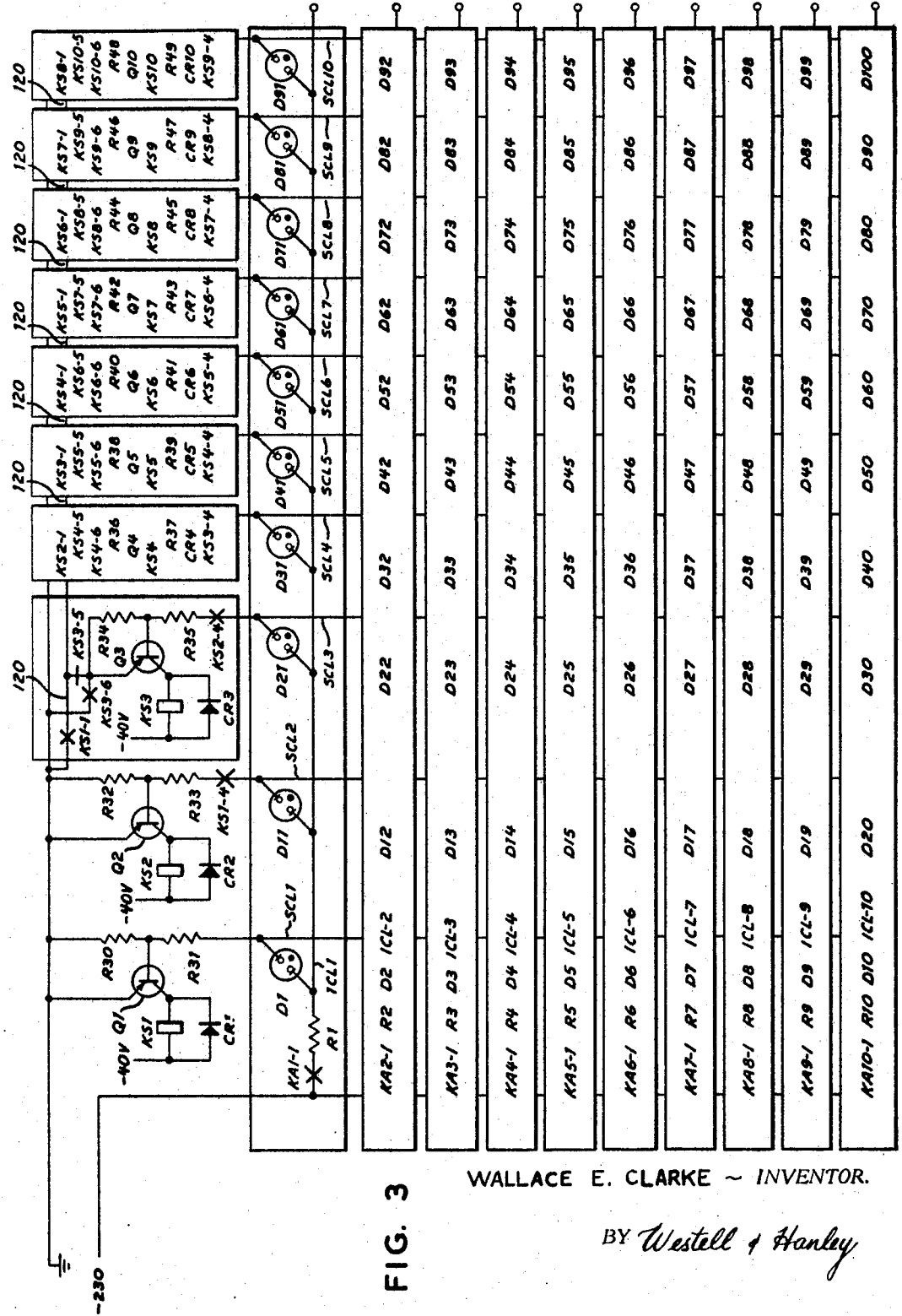
FIGURE 3 shows the sequence control circuity for determining the order of connection of the various microphones to the public address system by controlling the operation of the circuitry of FIGURE 2.

The sequence for connecting these diodes will be indicated in FIGURE 3 now to be discussed.

As shown in FIGURE 3, a −230 volt potential datum is connectable to 10 input control lines 1CL–1 to 1CL–10 respectively. The −230 volt datum is connectable to each input control line through the normally open contacts −1 of a corresponding KA relay, in series with a resistance R for this line. Thus the −230 volt source is: connected to 1CL–1 through the normally open contacts KA1–1 and relay R–1 connected to 1CL–2 through the normally open contacts KA2–1 and relay R–2, and so on. Each input control line is connected to 10 diode connections to be described hereafter.

Input control line 1CL–1 is provided with connections to one terminal of diodes D1, D11, D–21, D–31 and so on consecutively up to D–91. Similarly input control line 1CL–2 is connected one terminal of each of diodes D–2, D–12, D–22 and so on up to D–92. Similar connections are provided for lines 1CL–3 to 1CL–10, so that in all, these 10 lines supply connections for one of the two terminals of each of 100 diodes numbered and connected in the manner set out. Ten sequence control lines SCL are provided as described hereafter. The sequence control lines are designated SCL1, SCL2 and so on up to SCL10 and increasing numbering indicates progressively lowering priority. Thus line SCL1 represents highest priority, SCL2 is of one lower priority, and so on.

The sequence control line SCL1 is connected to a potential datum, in this case ground, through resistances R–30 and R–31 in series to the other terminal connection of diodes D1, D2, D3 and so on, in the same sequence, to D10. The connection between resistances R–30 and R–31 is connected to the base of a PNP transistor Q–1 whose emitter is connected to ground and whose collector is connected to a B− (here −40 volts) through a relay KS1 and a rectifier CR–1 in parallel. The rectifier CR–1 is oriented to conduct when the potential at the −40 volt datum is higher than at the collector, and the purpose of the rectifier is to suppress transient voltages about relay KS1. The ground is connected to sequence control line SCL2, through resistances R–32 and R–33 and the normally open contacts KS1–4 in series. Sequence control line SCL2 is connected to the other terminals of diodes D–11, D12 and so on in the same sequence up to D–20. The base of a PNP transistor Q–2 is connected between resistances R′32 and R′33 and the emitter is connected to ground as before. The collector of transistor Q–2 is, as in SCL–1, connected to a −40 volt source through a relay KS2 and rectifier CR2 in parallel, with the rectifier oriented and provided for a similar purpose as was rectifier CR1. Ground is also connected to a sequence control line SCL3 through normally open contacts KS3–6, resistances R34 and R35, and the normally open contacts KS2–4 in series. The base of a transistor Q–3 is connected between resistances R–34 and R–35 while the emitter of transistor Q–3 is connected between R–34 and normally open contacts KS3–6. The collector of transistor Q–3 is connected through relay KS–3 and rectifier CR–3 in parallel to the —40 volt source with rectifier CR–3 having the same orientation and being for the same purpose as the other CR rectifiers. An alternate path to ground from between the connection of the emitter of transistor Q–3 and the resistance R–34 (to that through KS3–6) is provided through normally closed contact KS3–5 and along a line 120 through normally open contacts KS1–1. Sequence control line SCL–3 is connected to the other terminals of diodes D21, D22 and so on in the same sequence up to D30.

Sequence control line SCL4 is connected in a similar manner to the sequence control line SCL3, there being a connection from ground through normally open contacts KS4–6, resistances R–36 and R'37, and normally open contacts KS3–4 in series to SCL4.

The transistor Q–4 having its base connected to a —40 volt source through relay KS–4 and rectifier CR–4 in parallel. The emitter of transistor Q–4 is connected between resistance R–36 and normally open contacts KS4–6 and an alternative path from between the emitter and resistance R–36 to ground is provided through normally closed contact KS4–5 and along line 120 through normally open contacts KS1–1 and KS2–1.

Sequence control line SCL4 is connected to the other terminals of diodes D41–D50. Similar connections to those described are provided for the sequence control lines SCL–5 to SCL–10 and such sequence control lines of higher number are each connected to each of the input control lines through a diode so that sequence control line SCL(n) is connected to the input control lines through diodes D(10n–9)–D(10n). Hence each input control line is connected to each sequence control line through a diode. The 100 diodes are designed to have a higher striking potential and a lower extinguishment potential and hence to maintain conduction (once established) at values between said potentials. The design of the 100 diodes and the resistances R–1 to R–10 on the one hand and the pairs of resistances in the group R–32 to R–48 are so related in operating values that:

(a) The potential between datums 0 to —230 volts is greater than the striking potential, (b) The potential in an input control line during conduction therein through a diode from a sequence control line differs from 0 volts by less than the striking potential, (c) The potential in a sequence control line during conduction therein through a diode to an input control line differs from —230 volts by less than the striking potential, (d) The potential difference between a sequence control line and an input control line during conduction therebetween across a diode is greater than the extinguishment potential so that conduction in the diode is sustained under these conditions.

It will be noted that in the specific embodiment, the highest priority sequence control line SCL1 corresponds to a microphone using the loudspeaker system, and the sequence control lines are numbered upwardly SCL–2, SCL–3, SCL–4, etc. in order of decreasing priority corresponding to the times other microphones have been waiting to use the system. It may be noted that in each case, connection from SCL lines, of third highest priority and lower, through the two series resistances, has alternate connections to ground, one through the normally open –6 contacts of the KS relay associated with the SCL line, and the other through the normally closed –5 contacts of the KS relay associated with the SCL line and then in series along line 120 through the normally open contacts –1 of the KS relays from KS1 numbered upward (KS2, KS3, etc.) to the number characteristic of the sequence control line of two higher priority than the line having such alternate connection to ground.

It should be noted that transistors Q1 to Q10 and associated (even numbered) resistors R32, R34 etc. to R48 are provided to act as current multipliers when the current operating level of the diodes D1 to D100 is less than that required to operate the respective relays KS1 to KS10. However, where diodes D1 to D100 are used, with sufficient current capacity to operate the KS relays, each such KS relay may be connected in series with the diode, and an odd numbered resistance R33, R35—while the transistors Q1 to Q10 and the even numbered resistors may be dispensed with.

Before the operation of the circuitry is discussed, the following will be noted, firstly, that on conduction from ground through an SCL line, a diode and an ICL line to the —230 volt source; the transistor Q associated with the ICL line, will conduct due to the drop of the potential of the base of the transistor relative to the emitter due to the voltage drop across whichever of the even numbered resistors R30, R32, etc. is involved; as a result conduction will take place through the corresponding KS relay and the latter will be energized, closing the –4 contacts in the sequence control line of next lower priority. Secondly, it will be noted that when a sequence control line, (say) SCL–1 is not conducting, then relay contacts KS1–1 will be open and this, by opening line 120 at that point, will prevent the initiation of conduction in any non-previously conducting sequence control line from sequence control line SCL–3 or of higher number and similarly nonconduction in sequence control line SCL–2 will during the continuation of that state, through open contacts KS2–1, prevent the later initiation of conduction of any sequence control line from SCL4 or of higher number and so on. It will, however, be noted that if a sequence control line (say) SCL–3 is conducting then normally open contacts KS3–6 are closed by relay KS–3, providing a path to ground bypassing line 120, and hence the line will maintain conduction even though, due to a termination of conduction in sequence control line SCL1 relay, KS1 is later deenergized and as a result the contacts KS1–1 are opened.

Also it should be noted that the KS relays are designed so that on deenergization, the contacts thereof operate in the following sequence:

First— –2 contacts open and –3 contacts close.

Second— –1 contacts open.

Third— –4 contacts open and –5 contacts close.

In describing the operation of the device, it will be assumed that the microphones 1, 10, 3, and 4 are energized by depression of the respective keys thereof in that order, and that later microphone 3 while still waiting for connection to the public address system is deenergized and later reenergized, all while the remaining microphones 1, 10 and 4 remain energized.

In describing the operation, it will be assumed that initially the loudspeaker system shown in FIGURE 1 is not in use, and hence none of the microphones are connected thereto, none of the relays in the series KN21 to KN30 is energized, none of the switches S1 to S10 is closed, and none of the KA1 to KA10 relays is energized. On depression of the key of microphone 1, therefore, switch S1 is thereby closed and relay KA1 is energized, since a path is provided from B+ through S1 relay KA1, contacts KA1–4 and the normally closed contacts of lockout line 133, from KS2–3 to KS10–3 to ground. On energization of relay KA1 the relay becomes "locked-in" due to the closing of contacts KA1–5 while contacts KA1–4 are opened. The energized relay KA1 also closes, in input control line ICL–1, the contacts KA1–1 thus placing line ICL–1 across its length at a potential of —230 volts. This voltage therefore appears at one terminal of all diodes D1, D11 and so on to D91. However, the sequence control lines SCL2 and SCL10 connected to the other terminals of the diodes in this group from D11 to D91, are not connected to ground since (inter alia) –4 contacts of KS relays are open in each line. Only diode D1 of the group connected to ICL-1 is connected also to a sequence control line SCL-1 which is connected to ground. Thus diode D1 will light or strike. When diode D1 lights, allowing conduction in ICL-1 and SCL-1 the consequent voltage drop in resistance R1 is such that during such conduction, the line ICL-1 is not of sufficient potential difference from ground to cause the lighting or striking of another diode connected thereto at such time as another sequence control line is connected to ground potential. Similarly, during such conduction in SCL-1 the resistance rise in resistances R-30 and R-31 is sufficient to insure that the potential of sequence control line SCL-1 differs from −230 volts by less than the striking voltage of the diodes, hence the connection of another input control line to −230 volts cannot cause the striking of a second diode connected at its other end to SCL-1. The voltage rise during conduction in SCL-1 across R-30, as previously explained, causes conduction in a transistor Q-1 whereby the relay KS1 is energized, closing the normally open contacts KS1-4 in SCL-2. Sequence control line SCL-2 is now connected to ground.

At the same time, and to be described hereafter, energization of relay KS-1 causes the closing of normally open contacts KS1-2 in the lockout line 133 and the closing of normally open contacts KS1-1 in the ground connection line 120 for sequence control lines from 3 to 10.

Turning to FIGURE 2, it will be seen that the conducting diode D1 will radiate to and cause conduction in relay LDR-1 (which is located to receive light radiated from the diode D1). The consequent reduction of resistance in LDR-1 will cause the energization of relay KN21 and (turning to FIGURE 1) will close relay contacts KN21-4 and KN21-5 to connect the microphone leads ML1 to the lines 104-106 of the public address system for speaking thereon, and will open contacts KN21-2 and KN21-3. The relay KN21 or other mechanism operating at the same time, may be used to perform functions not directly associated with this invention such as to light a light on microphone 1 to indicate that the microphone is connected for use, to cut background music and to connect the amplifiers to the system inputs.

Assuming that microphone 1, connected as described above, is still in use when it is desired to use microphone 10 then, on actuation, microphone 10 will have the next priority among the waiting microphones. On the actuation of microphone 10 the key is depressed closing switch S10, and hence energizing relay KA10 through the lockout line 110 whereupon relay KA10 locks itself in over KA10-5 and disconnects from the lockout line by opening contacts KA10-4. The energization of KA10 causes the closing of contacts of KA10-1 (FIGURE 3) connecting the −230 volt datum to the input control circuit ICL-10. It will be seen that of the −4 contacts of the KS relays actuated through the sequence control lines, only KS1-4 is closed connecting SCL-2 to ground, the remainder of the −4 contacts being open. Sequence control line SCL-1 is below the striking potential relative to −230 volts due to the conduction in diode D1 and hence does not strike diode D10. Hence SCL-2 is the only line connected to ground and hence available for connection to ICL-10 and diode D20 connecting these lines, therefore, strikes. During conduction in diode D20, the potential of input line ICL10 becomes too high to strike another diode connected to any other sequence control line than SCL-2, and the potential of sequence control line SCL2 is, during conduction therein, too low for connection by striking a diode connected to any other input control line than ICL10.

Due to conduction in SCL-2, the voltage rise in resistance R-32 causes conduction in transistor Q-2 energizing relay KS2 and sequence control line SCL3 is connected to a voltage datum along line 120 by the closing of contacts KS2-4, since contacts KS1-1 have been previously closed. Also due to the energization of KS2, line 120 is completed as far as the circuitry associated with line SCL4 by the closing of contacts KS2-1. The energization of relay KS2 further closes contacts KS2-2 and opens contacts KS2-3 in the lockout line 133. However it will be noted that the lockout line 133 still provides a conducting path from the various switch lines through contacts KS1-2, KS2-2, contacts KS4-3 and through the remaining −3 normally closed contacts from KS5 to KS10. With microphone 1 still using the public address system and microphone 10 having next priority, determined by the connection of ICL-10 to SCL-2, if microphone 3 is now depressed, switch S-3 is now closed energizing relay KA3, the opening of contacts KA3-4 detaching the relay KA3 from the lockout line and connecting it to direct voltage datum through the closing of contacts KA3-5. The energization of relay KA3 connects the −230 volt potential to input control line ICL-3. Since the potentials of sequence control lines SCL-1 and SCL-2 are too low to connect through the relevant diodes to line ICL-3 due to conduction in these respective lines, and since the −4 contacts of KS relays are only closed (for connection of the relevant SCL lines to ground) in lines SCL2, and SCL3, the only sequence control line available for connection to ICL-3 is sequence control line SCL-3 which connects to ICL-3 over diode D23. The resultant energization of relay KS-3 opens contacts KS3-5 and closes contacts KS3-6, disconnecting the line SCL-3 from its connection to ground through the line 120 and connecting it directly to ground whereby when relay KS1 is later deenergized by virtue of cessation of the conversation on ML1, with the consequent opening of switch S-1 and the deenergization of relay KA1, the resulting opening of contacts KS1-1 does not disconnect sequence control line SCL-3 from ground.

The energization of KS3 also closes contacts KS3-4, connecting sequence control line SCL-4 to ground through resistance 37, resistance 36, normally closed contacts KS4-5, and a line 120 through contacts KS2-1 and KS1-1. At the same time, and also as a result of the energization of relay KS3, line 120 is completed from the voltage datum as far as contacts KS4-4 on sequence control line SCL-5 by the closing of contacts KS3-1. In the lockout line, as a result of the energization of KS3, contacts KS3-2 are closed, contacts KS3-3 are opened and the lines containing switches "S" are then connectable to ground through the contacts KS1-2, KS2-2, KS3-2, KS5-3 and the remainder of the normally closed −3 contacts of relays KS6 to KS10 to ground.

When microphone 4 is actuated, the consequential closing of switch S-4 will actuate relay KA4 and connect it directly to ground as before, energizing relay KS4 and closing contacts KS4-4 to connect the sequence control line SCL5 for connection to ground, and at the same time, opening contacts KS4-5 and closing contacts KS4-6 to connect the line SCL4 through resistors R36 and R37 to ground directly, and by the opening of contacts KS4-5 disconnecting line SCL-4 from its connection to ground through line 120. At the same time contacts KS4-1 close, connecting the line 120 as far as the contacts KS5-4 of sequence control line 6. At this time it will be seen that if the remaining microphones 3 and 5 to 9 are energized, that they will respectively actuate the correspondingly numbered input control lines and that these will connect to sequence control lines 5-10 in order of energization, all assuming that the conversation between microphone 1 and the public address system is still in progress.

Assuming now that the input control lines ICL-1, -10, -3 and -4 are connected to sequence control lines as discussed, and assuming that therefore microphones 10, 3 and 4 are still waiting for the eventual use of the public address system, let it be assumed that the operator of microphone 3 releases his microphone key. As a result switch S3 is opened and relay KA3 deenergized, thus contacts KA3-1 are opened disconnecting ICL-3 from the −230 volt datum, hence diode 23 shuts off, conduction stops in SCL3, resulting in the deenergization of relay KS3.

In line with the sequence for operation of KS contacts, previously outlined, the deenergization of relay KS3 has the following sequential results:

First: Contacts KS3–2 open and contacts KS3–3 close. Contacts KS4–3 being already opened (since SCL4 is still conducting) it will be noted that during the joint maintenance of nonconduction in SCL–3 and conduction in SCL4, depression of a microphone key cannot affect the priority system, since the KA relay corresponding to the key cannot be energized due to the fact that both parallel contacts KS3–2 and KS4–3 in the lockout line 133 are open. Thus no incoming calls can achieve a priority position while this situation persists and it will be noted that the lockout line will be nonconducting, and hence prevent energization of a KA relay during the time a sequence control line is nonconducting with the sequence control line of next lower priority conducting.

Second: Contacts KS3–1 open, disconnecting line 120 from sequence control line SCL5 and those of lower priority; and it will be noted that (speaking generally) on cessation of conduction in a sequence control line disconnecting the line 120 from all sequence control lines of two lower priority than the one initially becoming nonconducting. The result is that an input control line connected to the −230 volt datum but disconnected from a sequence control line cannot (during the period the −1 contact of the KS relay is open) connect to a sequence control line of two or more lower priority than the one to which it was connected. Note, however, that on cessation of conduction in SCL3, any sequence control line of two or more lower priority, i.e. SCL–5, SCL–6 etc., which is already connected to an input control line, will not be disconnected therefrom or have conduction therein interrupted, due to the later opening of contacts KS3–1, since such sequence control lines, SCL–5 for example, will then be directly connected to ground through KS5–6.

Third: Contacts KS3–4 open, disconnecting sequence control line SCL4 from ground, hence stopping conduction in diode 34. Incidentally contacts KS3–5 close. When diode D23 shuts off, and conduction stops in SCL3 it will be noted that all the diodes connected to SCL3 from D21 to D30, rise to ground potential. As a result of the opening of contacts KS3–4, extinguishing diode D34 the input control line ICL–4 in unconnected to a sequence control line and reaches −230 volt potential. It will be seen that ICL–4 cannot connect to sequence control lines SCL1 or SCL2 due to their raised potential through conduction through diodes D1 and D20 respectively. ICL–4 cannot connect to sequence control line SCL4 due to the opening of contacts KS3–4 and cannot connect to a sequence control line of higher number (lower priority) due to the opening of contacts KS3–1. Thus the input control line ICL–4 connects to sequence control line SCL3 through the striking of diode D–24.

As a result of conduction in diode D–24, relay KS3 is again energized, reclosing contacts KS3–4. In the discussion above it has been assumed that ICL–4 corresponding to microphone 4 was the call of lowest priority. However, if a call of still lower priority has been waiting (initially on SCL–5), then at the time of the opening of contacts KS3–4, line SCL–4 being nonconducting, will deenergize KS4 with contacts KS4–4 opening to halt conduction in SCL5 line, and hence disconnecting the connected input control line therefrom while contacts KS4–1 render SCL lines numbered 6 or higher unavailable, hence the input control line formerly connected to SCL–5 will move up to SCL–4 which just prior has been disconnected from ICL–4.

In an analogous operation, input control line connected to SCL–6 and upward will move up in priority (i.e., to lower numbered sequence control lines) and it will be seen, from an examination of the lockout line, that any time when a sequence control line is unconnected and hence nonconductive (and hence the corresponding KS relay is deenergized) while the sequence control line of next higher priority is conducting, then incoming calls cannot connect an input control line to the −230 volt datum since parallel −2 and −3 contacts will be open in the lockout line. Hence no newly depressed microphone key can cause connection of the corresponding input control line to a sequence control line until there are no sequence control lines nonconducting while sequence control lines of lower priority are conducting. Hence now newly activated microphone can jump ahead in priority of prior waiting calls due to connection of its input control line to the intermediate nonconducting sequence control line. Moreover due to the fact that the initiation of conduction in sequence control line SCL3 and those of lower priority can only take place when the −1 contact of the KS relay of the SCL line of two higher priority is closed, it will be seen that where there is an input control line connected to a sequence control line, with a higher priority sequence control line unconnected to an input control line, then unconnected sequence control lines of two or more priority than the unconnected sequence control line, are made unavailable, and hence when a datum-connected input control line is disconnected from a sequence control line, it must move up in priority along the sequence control lines and cannot move down.

From the description thus far, it will be seen that the system has the advantage that, with a plurality of calls waiting and ready for operation, the system will arrange these in order of priority determined by the length of time each source has been ready, and continuously waiting. The system provides that on disconnection of a source from the ready state, the system causes that source's priority to be filled by the continuously waiting source of next lower priority and causes still lower priority sources to move up filling up the consequent gaps in priority while remaining in their relative priority to each other. The system ensures that a source disconnected from the ready state and then re-connected will be unable to obtain a priority until all lower priority sources have moved up in priority, hence the re-connected source will receive the lowest unfilled priority. In prior art priority circuits, two disadvantages occurred: firstly, the disconnection of a "ready" source left a gap in the priorities which remained until it was detected by a scanner or otherwise or until its priority had elapsed and secondly, the repeated disconnection and re-connection of a source could take up a second priority and a third, and so on and hence the whole line could be filled up to the prejudice and delay of other sources as a result of a repeatedly connected and disconnected line. It will be seen that these disadvantages are avoided by the present system.

In normal operation, when as a result of disconnection of a sequence control line from an input control line, the input control lines have all moved up in priority as determined by the time of waiting in the ready state, so that there are no gaps in priority, then the further incoming calls are no longer locked out, since the lockout circuit will now contain a complete line through the −2 contacts of the KS relays corresponding to the conducting sequence control lines and through the −3 contacts of the KS relays corresponding to the nonconducting sequence control lines. Thus in the specific embodiment and in the situation described, with the input control lines ICL–1, ICL–10 and ICL–4 latterly connected respectively to sequence control lines SCL1, SCL2 and SCL3, respectively, the lockout line has closed connections through KS1–2, KS2–2 through KS3–2 and KS4–3 in parallel and through the −3 contacts of KS relays from KS5 to KS10.

On the release of the key of microphone 1, indicating the end of communication between the microphone and the public address system, switch S1 opens. The opening of S1 breaks the circuit to relay KA1 opening contacts KA1–1 (and incidentally disconnecting the lock-in contacts KA1–5 and reconnecting relay KA1 to the lockout line 133 through contacts KA1–4), ready for a later energization. The opening of contacts KA1–1 disconnects line ICL–1 from the –230 volt datum and diode D1 is extinguished. This causes LDR–1 to increase in resistance (see FIGURE 2) to a point where relay KN21 is deenergized. This (see FIGURE 1) opens the –4 and –5 contacts of relay KN21 and closes –2 and –3 contacts of relay KN21, disconnecting microphone 1 from the public address system.

Since conduction has been stopped in sequence control line SCL1 (on extinguishment of diode D1) relay KS1 is deenergized, whereby contacts KS1–2 open and contacts KS2–3 contacts also being open, preventing (while these contacts are contemporaneously open) the connection of any unconnected input control line to the –230 volt datum, since the lockout line is open and no KA relay may be newly energized during this interval. Thus anyone depressing a microphone key when the above contacts are contemporaneously open, cannot gain input priority by gaining access to sequence control line 1.

Moreover, the opening of contact KS1–1 prevents the later initiation of conduction in any of the sequence control lines 3 to 10, while the opening of contacts KS1–4 disconnects input control line ICL–10 from SCL–2. Since the only available sequence control line for connection to ICL–10 is therefore SCL–1 these connect through the striking of diode D10. This results through the drop in resistance of LDR10, in the energization of relay KN30 (FIGURE 2) acting through its contacts –4, –5, –2 and –3 (FIGURE 1) to connect microphone 10 to the public address system.

When diode D10 is lit and SCL1 is again conducting, KS1–4 will reclose to render SCL2 available for connection to an ICL line and KS1–1 will close to complete line 120 as far as SCL3.

Due to the extinguishment of diode D20, KS2–4 is opened, and KS2–1 opens to prevent later energization of sequence control lines 4 to 10 and hence the input control line ICL–4 is disconnected from diode D23 and connected to diode D13, and the incoming control lines of lower priority move up by analogous operation to that described above.

In general while the system has been discussed for use in controlling the priority of microphones to a public address system, it will be seen that none of the sequence control circuitry is characteristic of this function, and therefore, it will be understood that the use of the system and method are not limited to the application shown but may be used in any application where it is desired that a number of sources of signals or information shall wait in the order of chronological priority to use a lesser number of outputs.

In the embodiment shown the first sequence control line corresponds to connection of a source to an input while the remaining control lines are "waiting" lines. It is considered within the scope of the invention to use the sequence control system described for such "waiting" lines even though there is more than one input line and where to the circuitry for the waiting lines there is appended circuitry to assign the highest priority "waiting" line to one of a number of input lines when a vacancy occurs therein.

The system and method are also useful to control the performance of operations in situations where it is desired that such operations shall be performed in the order determined by the length of time which they have been ready and waiting to be performed. The system of the specific embodiment may be used in this way by providing that wit h(say) 10 different operations to be performed, the 10 respective actuating means, adapted to assume a ready state when it is desired to have such operations performed, are connected respectively to switches S1 to S10. The sequence control circuitry is and will operate as described with the diode D1 adapted to cause conduction through LDR1; and with contacts of a relay such as KN21 located in series with LDR1 connected on energization of KN21, to cause performance of the first operation. Similarly diode D2 striking will cause a relay such as KN22 to operate contacts to cause performance of a second operation; and so on. Thus such operations will, with this system and method, be performed in the order determined by the relative times of assumption, by the actuation means, of the ready state. Further, as noted in the movement of a "ready" actuating means to the unready, and then again to the ready state, will cause the corresponding operation to lose its priority, the priorities of otherwise subsequent operation each step up one, and the rereadied actuating means received the lowest priority for its corresponding operation.

In the specific embodiment shown, the number of input control lines ICL is equal to the number of sequence control lines SCL. Thus the waiting sources or "means ready to perform operations" may be maintained in priority order by the system disclosed. It should be noted, however, that the inventive concept covers systems wherein the number of input control lines (and hence the number of sources or means ready to perform operations) exceeds the number of sequence control lines. Thus, if; with the circuitry otherwise similar to that shown in the preferred embodiment, there were provided (say) 20 input control lines ICL with 10 sequence control lines SCL (and each input control line connected through a diode to each sequence control line); then, for energization of up to ten input control lines at one time, the system will operate in relation to any such input control line as described heretofore. For energization of more than ten input lines (say 15), the first ten will be maintained in priority, as described, respectively connected to input control lines. The remaining five will be unconnected to sequence control line. When the lowest priority sequence control line becomes available therefore, one of the "remaining five" input control lines will be connected thereto. It is quite true that it is not certain which of the five lines will be connected (this will depend on the relative characteristics of the circuits and on transient conditions in the five lines at the time the sequence control line becomes vacant) and hence the longest waiting of the five may not move onto the priority system first. However, priority of calls will be maintained with such arrangement up to ten calls, the priority as determined by the sequence control lines will be maintained once an input control line is connected thereto. Such arrangement is therefore considered to be within the scope of the invention and it will be appreciated that some considerable saving on diodes and circuitry may be achieved in situations where the number of sources or "means ready to perform operations" is larger than the number of such sources or means which will be ordinarily waiting.

I claim:

1. Circuitry for controlling the selective connection of a plurality of sources to an input, comprising:

an input control line corresponding respectively to each source;

means corresponding to each such source actuable to connect and disconnect said input control line to or from a first potential datum;

a plurality of sequence control lines designated in a predetermined order of priority;

said sequence control lines being connectable to a second potential datum;

means for connecting the highest priority sequence control line to said second potential datum;

means responsive to conduction in all sequence control lines of higher priority to connect a sequence control line to said second potential datum;

means responsive to the existence of a nonconducting input control line connected to said first potential datum and to the existence of a nonconducting sequence control line connected to said second potential datum, to cause connection between said nonconducting lines and conduction therein;

means preventing the connection of a conducting input control line to a second sequence control line;

means preventing the connection of a conducting sequence control line to a second input control line;

means responsive to the disconnection of an input control line from said first potential datum, for disconnecting said input control line from its connected sequence control line;

means responsive to the disconnection of a sequence control line from said second potential datum for disconnecting said sequence control line from its connected input control line;

means actuable on the cessation of conduction in a sequence control line to interrupt the conducting path in the sequence control line of next lower designated priority;

means effective during intervals when a sequence control line is nonconducting and a lower designated priority sequence control line is conducting to prevent input control lines being connected to sequence control lines of lower designated priority than said nonconducting line;

means responsive to the connection between the highest designated priority sequence control line and an input control line to provide a signal adapted to connect the source, corresponding to said last mentioned input control line, to said input.

2. Circuitry as claimed in claim 1 including:
means, effective during intervals when a sequence control line is non-conducting and a lower priority sequence control line is conducting; to prevent said actuable means from connecting an input control line to a first datum.

3. Circuitry as claimed in claim 1:
wherein each sequence control line is connected to an input control line through a diode;
such diodes being designed and constructed to have a higher striking potential and a lower extinguishment potential;
said first and second datum potentials differing by an amount greater than said striking potential;
said input control lines being so connectable to said first datum through means, designed so that with conduction in an input control line, the potential therein differs from that of said second potential datum by an amount between said striking and extinguishment potential;
said sequence control lines being so connectable to said second datum through means designed so that with conduction therein the potential therein differs from that of said first potential datum by an amount between said striking and said extinguishment potential;
said input control lines and sequence control lines being connectable to their respective datum potentials through means designed, so that on conduction in an input control line through the connecting diode and a sequence control line, the potential across said diode is above said extinguishment potential.

4. Circuitry as claimed in claim 2:
wherein each sequence control line is connected to an input control line through a diode;
such diodes being designed and constructed to have a higher striking potential and a lower extinguishment potential;
said first and second datum potentials differing by an amount greater than said striking potential;
said input control lines being so connectable to said first datum through means designed so that with conduction in an input control line, the potential therein differs from that of said second potential datum by an amount between said striking and extinguishment potential;
said sequence control lines being so connectable to said second datum through means designed so that with conduction therein the potential therein differs from that of said first potential datum by an amount between said striking and said extinguishment voltage;
said input control lines and sequence control lines being connectable to their respective datum potentials through means designed so that on conduction in an input control line through the connecting diode to a sequence control line, the potential across said diode is above said extinguishment voltage.

5. Circuitry as claimed in claim 3 wherein each means responsive to the connection between the highest priority sequence control line, and an input control line, comprises means, responsive to conduction in the diode connecting said lines, to provide a signal adapted to connect the source corresponding to said last mentioned input control line to said input.

6. Circuitry as claimed in claim 4 wherein said means characteristic of the connection between the highest priority sequence control line, and an input control line comprises means, responsive to conduction in the diode connecting said lines, to provide a signal adapted to connect the source corresponding to said last mentioned input control line to said input.

7. Circuitry as claimed in claim 1 wherein said means actuable to connect said input control lines to a first datum comprises a relay corresponding to each of said input control lines;
operable when energized to perform said last mentioned connection;
said relay being energizable through conduction in a plurality of parallel circuits arranged in series, each parallel circuit comprising normally closed contacts corresponding to one sequence control line and normally open contacts corresponding to the sequence control line of next higher priority;
wherein such a parallel circuit is provided having normally closed contacts corresponding to each sequence control line except that of highest priority, such contacts of both types lines assuming the opposite to normal condition when the sequence control line to which they correspond is conducting.

8. Circuitry as claimed in claim 2 wherein said means actuable to connect said input control lines to a first datum comprises:
a relay corresponding to each of said input control lines; operable when energized to perform said last mentioned connection;
said relay being actuable through conduction in a plurality of parallel circuits arranged in series, each parallel circuit comprising normally closed contacts corresponding to one sequence control line and normally open contacts corresponding to the sequence control line of next higher priority;
wherein such a parallel circuit is provided having normally closed contacts corresponding to each sequence control line except that of highest priority;
such contacts of both types assuming the opposite to normal condition when the sequence control line to which they correspond is conducting.

9. Circuitry for controlling the selective performance of a plurality of operations, comprising:
an input control line corresponding respectively to each operation;
means corresponding to each such operation actuable to connect and disconnect said input control line to and from, respectively, a first potential datum;
a plurality of sequence control lines designated in a predetermined order of priority;
said sequence control lines being connectable to a second potential datum;
means for connecting the highest designated priority sequence control line to said second potential datum, and means responsive to conduction in all sequence control lines of higher designated priority to connect a sequence control line to said second potential datum;

means responsive to the existence of a non-conducting input control line connected to said first potential datum and to the existence of a nonconducting sequence control line connected to said second potential datum, to cause connection between said nonconducting lines and conduction therein;

means preventing the connection of a conducting input control line to a second sequence control line;

means preventing the connection of a conducting sequence control line to a second input control line;

means responsive to the disconnection of an input control line from said first potential datum, for disconnecting said input control line from its connected sequence control line;

means responsive to the disconnection of a sequence control line from said second potential datum, for disconnecting said sequence control line from its connected input control line;

means actuable on the cessation of conduction in a sequence control line to interrupt the conducting path in the sequence control line of next lower designated priority;

means effective during intervals when a sequence control line is nonconducting and a lower designated priority sequence control line is conducting to prevent input control lines being connected to sequence control lines of lower designated priority than said nonconducting line;

whereby a sequence control line connected to second potential datum and unconnected to a input control line has connected thereto the input control line formerly connected to the sequence control line of next lower designated priority, and so on;

means characteristic of the connection between the highest designated priority sequence control line and an input control line, to provide a signal to perform the operation corresponding to said last mentioned input control line.

10. A method of determining priority between a plurality of operations, the method making use of a actuation means corresponding to each operation, each such actuation means designed to assume a ready state and an unready state when, respectively, ready and unready to have such operation performed, a plurality of input control lines each corresponding to one such operation, a plurality of sequence control lines designated in order of priority, comprising the steps of:

connecting said input control lines respectively to sequence control lines of priority determined by the chronological order of movement to the ready state of the corresponding actuation means;

causing conduction in connected input control and sequence control lines;

disconnecting an input control line from its connected sequence control line on change to the unready state of the actuation means corresponding to said input control line;

on disconnection of an input control line from a particular sequence control line, disconnecting the input control line connected to the sequence control line of next highest priority to the one disconnected, and connecting said last mentioned input control line to said particular sequence control line;

and on the connection of an input control line to the sequence control line of highest priority, providing a signal utilizable to perform the operation corresponding to the last mentioned input line.

11. A method of determining the priority of connection of sources to an input, the method making use of a plurality of sequence control lines arranged in order of priority, and a plurality of energizable input control lines each corresponding to a source which is designed and connected to assume a ready or an unready state comprising the steps of:

connecting said input control lines to respective sequence control lines of priority determined by the chronological order of movement to the ready state of the corresponding source;

causing conduction in connected input control and sequence control lines;

disconnecting an input control line from its connected sequence control line on change to the unready state of the source corresponding to said input control line;

on disconnection of an input control line from a particular sequence control line, disconnecting the input control line connected to the sequence control line of next highest priority to the one disconnected, and connecting said last mentioned input control line to said particular sequence control line;

and on the connection of an input control line to the sequence control line of highest priority connecting to the input the source corresponding to the last mentioned input control line.

12. Sequence control circuitry comprising:

a plurality of sequence control lines each connected to assume a conducting or a non-conducting state;

a plurality of sequence control lines being connectable to a second potential datum;

each sequence control line other than that of highest designated priority having first contacts in the connection from the sequence control line to a first potential datum arranged to open and close when the sequence priority line of next higher designated priority is nonconducting and conducting respectively;

each sequence control line other than those of two highest designated priority being connectable to said first datum through said first contacts in series with a series circuit of second sets of contacts corresponding to each sequence control line of two higher designated priority;

each second set of contacts being responsive to conduction or nonconduction in the sequence control line to which they correspond, to open and close when said corresponding sequence control line is nonconducting and conducting respectively;

a plurality of input control lines each connectable to each of said sequence control lines;

means for selectively connecting and disconnecting each of said input control lines to and from a second datum;

means responsive to connection of an input control line to said second datum to connect said last mentioned input control line to a sequence control line connected to said first datum;

means responsive to such connection to cause conduction in such connected lines;

means responsive to connection of an input control line to a sequence control line to prevent connection of another line to either of said connected lines;

means responsive to disconnection of a sequence control line from said first datam to disconnect a connected input control line from said sequence control line;

means responsive to disconnection of an input control line from said second datum to disconnect a connected sequence control line from said input control line;

means responsive to the connection of an input control line to the sequence control line of highest designated priority to provide a control signal.

13. Sequence control circuitry as claimed in claim 12 comprising:

means responsive to conduction and nonconduction in a sequence control line to connect and disconnect said first contacts to and from said first datum by a connection bypassing said second contacts.

14. Sequence control circuitry as claimed in claim 13 wherein means are provided actuable on conduction in a sequence control line while the sequence control line of next higher designated priority is non-conducting to prevent connection of an input control line to said second datum.

15. Sequence control circuitry as claimed in claim 12:
wherein each sequence control line is connected to an input control line through a diode;
such diodes being designed and constructed to have a higher striking potential and a lower extinguishment potential;
said first and second datum potentials differing by an amount greater than said striking potential;
said input control lines being so connectable to said second datum through means designed so that, with conduction in an input control line, the potential therein differs from that of said first potential datum by an amount between said striking and said extinguishable potential;
said sequence control lines being so connectable to said first datum through means designed so that with conduction therein the potential therein differs from that of said second potential datum by an amount between said striking and said extinguishment potential;
said input control lines and sequence control lines being connectable to their respective datum potentials through means designed so that on conduction in an input control line through the connecting diode to a sequence control line, the potential across said diode is above said extinguishment potential.

16. Sequence control circuitry as claimed in claim 12:
wherein each sequence control line is connected to an input control line through a diode;
such diodes being designed and constructed to have a higher striking potential and a lower extinguishment potential;
said first and second datum potentials differing by an amount greater than said striking potential;
said input control lines being so connectable to said second datum through means designed so that, with conduction in an input control line, the potential therein differs from that of said first potential datum by an amount between said striking and said extinguishment potential;
said sequence control lines being connectable to said first datum through means designed so that with conduction therein the potential therein differs from that of said second potential datum by an amount between said striking and said extinguishment potential;
said input control lines and sequence control lines being connectable to their respective datum potentials through means designed so that on conduction in an input control line through the connecting diode and a sequence control line, the potential across said diode is above said extinguishment potential;
wherein said diodes provide radiation when conducting and wherein said control signal is embodied in the radiation provided when a diode, connecting an input control line to the highest designated priority sequence control line, is conducting.

17. Sequence control circuitry as claimed in claim 16 comprising:
means responsive to conduction and nonconduction in a sequence control line to connect and disconnect said first contacts to and from said first datum by a connection bypassing said second contacts.

18. Sequence control circuitry as claimed in claim 17 wherein means are provided actuable on conduction in a sequence control line while the sequence control line of next higher designated priority is nonconducting to prevent connection of an input control line to said second datum.

References Cited
UNITED STATES PATENTS 2,722,566 11/1955 Peterson.
3,300,758 1/1967 Hawley.
3,366,849 1/1968 De Raedt et al.

DONALD J. YUSKO, *Primary Examiner.*

U.S. Cl. X.R.

179—1